Patented Mar. 9, 1943

2,313,464

UNITED STATES PATENT OFFICE 2,313,464

MANUFACTURE OF SPONGE RUBBER

William J. Clayton, Mishawaka, Ind., assignor to United States Rubber Company, New York, N. Y., a corporation of New Jersey No Drawing. Application July 2, 1941, Serial No. 400,800

15 Claims. (Cl. 260—723)

This invention relates to the manufacture of sponge rubber and more particularly to the manufacture of sponge rubber from latex.

Sponge rubber is commonly made by whipping a latex composition into a foam, pouring the foam into molds, setting the foam to an irreversible gel by means of a gelling agent, such as an alkali silicofluoride, and drying and vulcanizing to form sponge rubber. Generally, the latex compound is whipped up into a foam or froth before the gelling agent, and oftentimes before zinc oxide, is added, after which the alkali silicofluoride and zinc oxide are mixed into the foam just prior to pouring into the molds in order to prevent premature gelling of the foam. The setting of the foam to an irreversible gel in the molds can be made to take place at room temperature with alkali silicofluoride and zinc oxide in the foam, or the gelling action may be accelerated by raising the temperature of the foam in the mold. Where there is a temporary breakdown in the mold-filling or mold-conveying apparatus, or a breakdown at some stage of a continuous process for making the foam and converting it into the desired shape, there will often be a large accumulation of sensitized uncoagulated foam that cannot be molded or shaped until operations are resumed. In such a case it is eminently desirable, if not essential from a commercial viewpoint, to be able to arrest the gelling properties of the alkali silicofluoride and zinc oxide on the latex at whatever stages of the operations in advance of the shaping or molding step the latex is in a sensitized condition, otherwise the foam will gel to sponge rubber in the mixing or like apparatus during the breakdown, necessitating its removal, and depreciating its value to that of scrap material.

The present invention relates to a method of arresting the gelling properties of latex foam sensitized with alkali silicofluoride and zinc oxide so that the sensitized foam in the mixing or sensitizing or other storage apparatus will not set or gel in such apparatus during a temporary factory breakdown. The present method of desensitizing or arresting the gelling properties of the latex foam is such that the foam may be resensitized when desired, as when operations are resumed, merely by the addition of alkali silicofluoride.

According to the present invention, there is mixed into the sensitized foam wthout destroying the foam structure, small amounts of an alkali hydroxide and a material capable of precipitating zinc ions but which will not coagulate latex, such as an alkali tetraborate or carbonate or metaphosphate. Preferably, there is also added to the foam potassium ions when the alkali silicofluoride used to sensitize the latex is sodium silicofluoride. The term "alkali hydroxide" is used herein in its generally accepted sense as inclusive of ammonium and alkali-metal hydroxides, but exclusive of polyvalent metal hydroxides. The term "alkali" as referring to the tetraborates, carbonates, and metaphosphates, which are exemplary of various common materials capable of precipitating zinc ions, is used in its generally accepted sense as inclusive of the ammonium and alkali-metal salts, but exclusive of the polyvalent metal salts. Materials capable of precipitating zinc ions that are non-coagulative of latex, of which the alkali tetraborates, carbonates, and metaphosphates are merely exemplary, are ordinary water softeners which in their usual function of softening hard water precipitate polyvalent metal ions other than zinc ions, generally alkali earth ions. Alkali silicofluorides are commonly used to gel latex in amounts varying from .5 to 2.5 parts of alkali silicofluoride per 100 parts of rubber solids in the latex. The gelling or coagulation of latex by means of alkali silicofluoride is the result of the progressive solution and hydrolysis of the slightly soluble alkali silicofluoride with the consequent liberation of hydrogen ions which reduces the pH of the latex sufficiently to cause gelling of the same after a certain period of time. The alkali hydroxide which is added according to the present invention neutralizes or reacts with the alkali silicofluoride and prevents lowering of the pH of the latex in the foam to the gelling point. Alkali hydroxide alone has been found unsatisfactory to desensitize the foam since the zinc oxide which is primarily added for vulcanization purposes is also a destabilizer of the latex, and will tend to set the foam in an alkali as well as acid medium. The zinc oxide sensitizes the latex by virtue of the dissociation of some of the dissolved zinc hydroxide, which is in equilibrium with solids zinc oxide, into polyvalent zinc ions and hydroxyl ions, the zinc ions acting in their usual capacity as coagulating ions for the rubber particles in the latex. It is therefore necessary to prevent the dissociation of the soluble zinc hydroxide, which is in equilibrium with the solid zinc oxide, even though the alkali silicofluoride has been inactivated by an alkaline hydroxide. This inactivation of the coagulating action of the zinc oxide is accomplished by the addition of a material which is capable of precipitating zinc ions, such as an alkali tetraborate, carbonate, or metaphosphate, or other water softener.

When sodium silicofluoride or ammonium silicofluoride is the alkali silicofluoride used for sensitizing the foam, there is another aid which may be effectively used to arrest the sensitization of the latex foam besides the addition of the alkali hydroxide and the precipitant of zinc ions, namely, the addition also of potassium ions. This addition of potassium ions may be accomplished by adding potassium hydroxide as the alkali hydroxide, or by adding a potassium salt as the precipitant of zinc ions, or by adding a potassium salt of a strong acid, such as potassium chloride or sulphate or nitrate, or any combination of these three ways of introducing potassium ions. The potassium ions form a less soluble potassium silicofluoride by metathesis with the sodium or ammonium silicofluoride. The addition of potassium ions in excess of those that may be introduced when potassium hydroxide is the alkali hydroxide added, is desired in order to additionally repress the ionization of the formed potassium silicofluoride by common ion effect. For this reason, it is preferred to add a potassium salt of the strong acid in addition to potassium hydroxide and the precipitant for zinc ions in arresting the gelling properties of the latex sensitized with sodium or ammonium silicofluoride and zinc oxide. The amount of material capable of precipitating the zinc ions is not critical, .1 to 5 parts for example of sodium metaphosphate per 100 parts of rubber in the latex having proven effective where zinc oxide is present in amount up to 5 parts per 100 parts of rubber in the latex. The amount of alkali hydroxide should be sufficient to react with the dissolved alkali silicofluoride or to react with enough of it to prevent gelling of the latex in the foam taking place by the residual alkali silicofluoride during the rest period. If an excess of alkali hydroxide is used over the amount necessary to react with all the alkali silicofluoride present, then the excess must be neutralized when the foam is re-sensitized by the addition of alkali silicofluoride in order to obtain normal gelling properties of the foam. If such an excess of alkali hydroxide is not used, then the latex may be re-sensitized, as when operations are resumed, merely by the introduction of the normal amount of alkali silicofluoride used for gelling the latex. .1 to 1 part of alkali hydroxide per hundred parts of rubber have been added where the conventional .5 to 2.5 parts of alkali silicofluoride per hundred parts of rubber have been used to sensitize the latex. The amount of potassium salt, such as potassium chloride or sulphate, or nitrate, is not critical. The larger the amount of such salt that is added the more the ionization of the potassium silicofluoride will be repressed. 0.2 to 1.0 part of potassium chloride per 100 parts of rubber in the latex have been added and were effective in repressing the ionization of the potassium silicofluoride.

The following example is illustrative of the present invention. A latex composition of the following formulation was whipped into a foam in a conventional Hobart mixer:

| | Dry weight |
|---|---|
| Rubber (as 60% concentrated latex) | 100 |
| Soap | 2 |
| Sulphur | 2 |
| Antioxidant | 1 |
| Accelerator | 2 |

After whipping to the desired foam density, the foam was transferred to a mixing apparatus equipped with stirring paddles and was sensitized by mixing therein 3 parts of zinc oxide and 1.5 parts of sodium silicofluoride in the form of a 50% aqueous paste. In the normal course of operations, the foam and sensitizing paste were continuously introduced into the mixing apparatus and the sensitized foam poured into molds and the molds placed on a conveyor and passed through a heater at 100° F. where the latex set to an irreversible gel in 3 to 8 minutes. The sensitized foam would set at room temperature (70° F.) in 5 to 10 minutes. Ordinarily, if the process should be temporarily suspended by virtue of a breakdown in the conveyor or other apparatus which might take say 15 minutes for repairs, the sensitized foam in the mixing apparatus would have to be removed either before or after gelling and the resultant gelled foam sold for scrap. According to the present invention, when operations are interrupted, there is merely mixed into the sensitized foam in the mixing apparatus for each 100 parts of rubber in the latex 1.5 parts (dry weight) of an aqueous solution of 10 parts sodium metaphosphate, 10 parts potassium hydroxide, and 10 parts potassium chloride in 70 parts of water. This prevents the foam from gelling in the mixing apparatus. When operations are resumed, it is only necessary to mix into the thus de-sensitized foam 1.5 parts (dry weight) of sodium silicofluoride per 100 parts of rubber in the form of a 50% aqueous paste to re-sensitize the latex. The resensitized latex foam will gel in the molds in 3 to 8 minutes at 100° F.

In view of the many changes and modifications that may be made without departing from the principles underlying the invention, reference should be made to the appended claims for an understanding of the scope of the invention.

Having thus described my invention, what I claim and desire to protect by Letters Patent is:

1. The method of arresting the gelling properties of latex foam sensitized with alkali silicofluoride and zinc oxide which comprises mixing an alkali hydroxide and sodium metaphosphate with a latex foam which contains alkali silicofluoride and zinc oxide and which is capable of gelling on standing, while maintaining the foam structure.

2. The method of arresting the gelling properties of latex foam sensitized with alkali silicofluoride and zinc oxide which comprises mixing an alkali hydroxide and material selected from the group consisting of alkali phosphates, alkali carbonates, and alkali borates with a latex foam which contains alkali silicofluoride and zinc oxide and which is capable of gelling on standing, while maintaining the foam structure.

3. The method of arresting the gelling properties of latex foam sensitized with sodium silicofluoride and zinc oxide which comprises mixing potassium hydroxide and sodium metaphosphate with a latex foam which contains sodium silicofluoride and zinc oxide and which is capable of gelling on standing, while maintaining the foam structure.

4. The method of arresting the gelling properties of latex foam sensitized with sodium silicofluoride and zinc oxide which comprises mixing potassium hydroxide and material selected from the group consisting of alkali phosphates, alkali carbonates, and alkali borates with a latex foam which contains sodium silicofluoride and zinc oxide and which is capable of gelling on standing, while maintaining the foam structure.

5. The method of arresting the gelling properties of latex foam sensitized with sodium silicofluoride and zinc oxide which comprises mixing an alkali hydroxide, and material selected from the group consisting of alkali phosphates, alkali carbonates, and alkali borates, with a latex foam which contains sodium silicofluoride and zinc oxide and which is capable of gelling on standing, while maintaining the foam structure.

6. The method of arresting the gelling properties of latex foam sensitized with sodium silicofluoride and zinc oxide which comprises mixing an alkali hydroxide, a potassium salt of a strong acid, and sodium metaphosphate with a latex foam which contains sodium silicofluoride and zinc oxide and which is capable of gelling on standing, while maintaining the foam structure.

7. The method of arresting the gelling properties of latex foam sensitized with sodium silicofluoride and zinc oxide which comprises mixing potassium hydroxide, a potassium salt of a strong acid, and sodium metaphosphate with a latex foam which contains sodium silicofluoride and zinc oxide and which is capable of gelling on standing, while maintaining the foam structure.

8. The method of arresting the gelling properties of latex foam sensitized with sodium silicofluoride and zinc oxide which comprises mixing an alkali hydroxide, and material selected from the group consisting of potassium phosphates, potassium carbonates, and potassium borates, with a latex foam which contains sodium silicofluoride and zinc oxide and which is capable of gelling on standing, while maintaining the foam structure.

9. The method of arresting the gelling properties of latex foam sensitized with sodium silicofluoride and zinc oxide which comprises mixing an alkali hydroxide, a potassium salt of a strong acid, and material selected from the group consisting of alkali phosphates, alkali carbonates, and alkali borates, with a latex foam which contains sodium silicofluoride and zinc oxide and which is capable of gelling on standing, while maintaining the foam structure.

10. The method of arresting the gelling properties of latex foam sensitized with sodium silicofluoride and zinc oxide which comprises mixing potassium hydroxide, a potassium salt of a strong acid, and material selected from the group consisting of alkali phosphates, alkali carbonates, and alkali borates, with a latex foam which contains sodium silicofluoride and zinc oxide and which is capable of gelling on standing, while maintaining the foam structure.

11. The method of arresting the gelling properties of latex foam sensitized with ammonium silicofluoride and zinc oxide which comprises mixing potassium hydroxide and sodium metaphosphate with a latex foam which contains ammonium silicofluoride and zinc oxide and which is capable of gelling on standing, while maintaining the foam structure.

12. The method of arresting the gelling properties of latex foam sensitized with ammonium silicofluoride and zinc oxide which comprises mixing an alkali hydroxide, and material selected from the group consisting of potassium phosphates, potassium carbonates, and potassium borates, with a latex foam which contains ammonium silicofluoride and zinc oxide and which is capable of gelling on standing, while maintaining the foam structure.

13. The method of arresting the gelling properties of latex foam sensitized with ammonium silicofluoride and zinc oxide which comprises mixing an alkali hydroxide, a potassium salt of a strong acid and sodium metaphosphate with a latex foam which contains ammonium silicofluoride and zinc oxide and which is capable of gelling on standing, while maintaining the foam structure.

14. The method of arresting the gelling properties of latex foam sensitized with ammonium silicofluoride and zinc oxide which comprises mixing an alkali hydroxide, a potassium salt of a strong acid, and material selected from the group consisting of alkali phosphates, alkali carbonates, and alkali borates, with a latex foam which contains ammonium silicofluoride and zinc oxide and which is capable of gelling on standing, while maintaining the foam structure.

15. The method of arresting the gelling properties of latex foam sensitized with ammonium silicofluoride and zinc oxide which comprises mixing potassium hydroxide, a potassium salt of a strong acid, and material selected from the group consisting of alkali phosphates, alkali carbonates, and alkali borates, with a latex foam which contains ammonium silicofluoride and zinc oxide and which is capable of gelling on standing, while maintaining the foam structure.

WILLIAM J. CLAYTON.